Nov. 10, 1953    R. H. BLOXHAM    2,658,652
ICE-CREAM STICK DISPENSING MACHINE
Filed May 26, 1951    3 Sheets-Sheet 1

INVENTOR.
Ralph H Bloxham

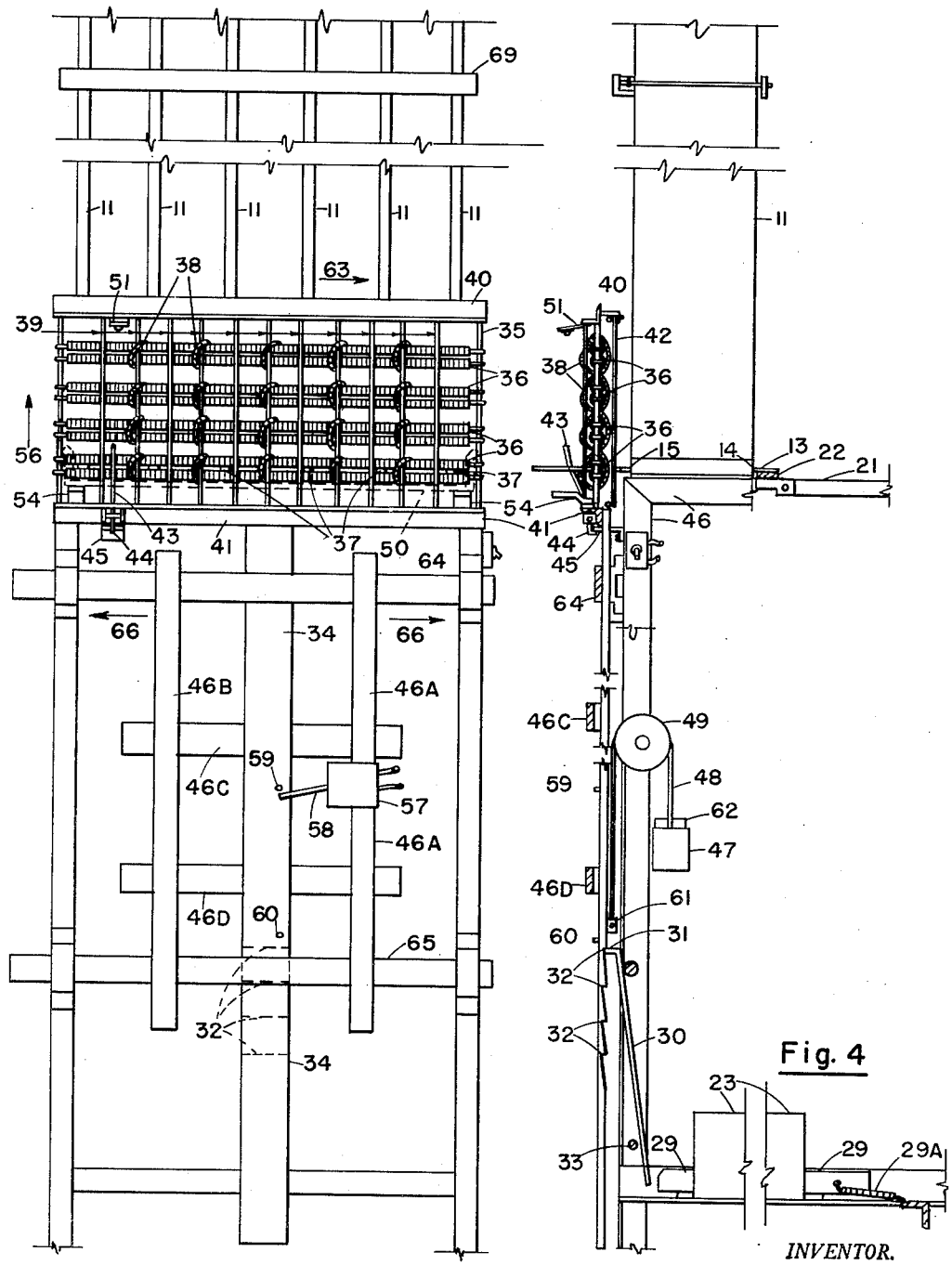

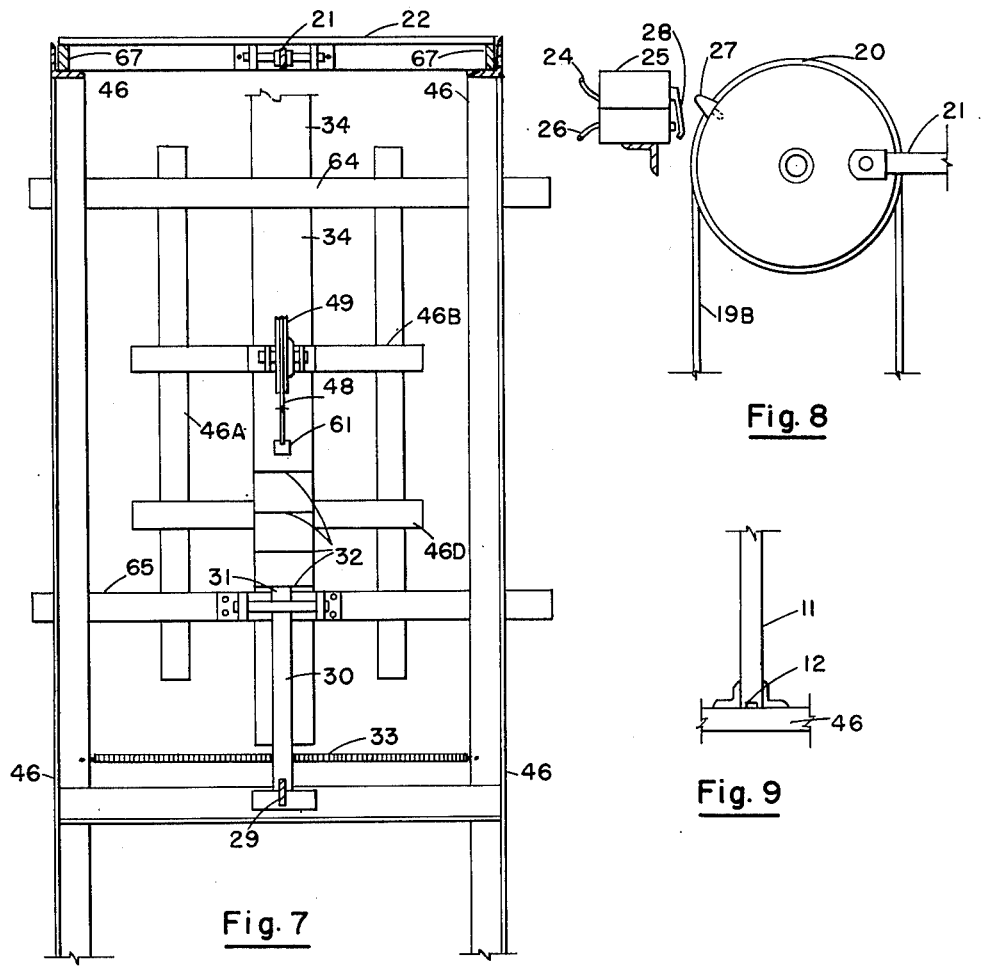

Patented Nov. 10, 1953

2,658,652

UNITED STATES PATENT OFFICE 2,658,652

ICE-CREAM STICK DISPENSING MACHINE

Ralph H. Bloxham, near Theodore, Ala.

Application May 26, 1951, Serial No. 228,451

3 Claims. (Cl. 226—14)

1

The present invention relates to an improvement in ice cream stick dispensing machine, used for placing ice cream sticks in the stick tray, and has for its main object and purpose to provide a machine which will perform this work automatically for a stick tray receiving 24 sticks as well as for one receiving 48 sticks.

Ice cream sticks are made of wood and are approximately 3/8" wide, 3/32" thick, and 4½" long. They are used as holders for ice cream or flavored water ice which are frozen on the sticks. Two types of trays are used in freezing each of these articles, a bottom deep tray into which the material to be frozen is placed, and a top stick tray into which the sticks are placed. In the case of ice cream only 24 sticks are used but with the flavored water ice 48 are used since two sticks are placed in each frozen "popsickle." Heretofore, the sticks have been placed in the top stick tray by hand, resulting in the hand touching each stick at least twice in the process. When the stick tray is filled a clamp on the tray is fastened and the sticks are held firmly in the tray until the freezing process is completed.

Perhaps the most important advantage found in the use of this new machine is that hands do not touch the sticks at all. From a health standpoint this is a definite advantage to the public.

Another advantage is found in the time saved. With the old process one person was required to fill the stick trays while another filled the bottom tray with the material to be frozen. With my new machine one person can perform both tasks with ease.

Another advantage resulting from the use of this new machine is that the sticks are placed uniformly so that the ends protrude an equal distance from the frozen food, resulting in a better appearance.

A further advantage is found in the construction of the machine. As may be readily seen from the drawings, the cost of manufacturing these machines is relatively low due to the simplicity of construction.

With these and other advantages to be pointed out as we proceed, I refer to the drawings in which like parts are denoted by the same reference characters throughout the several views:

Figure 3 is an enlarged front view of the machine.

2

Figure 4 is an enlarged partial side view with parts broken away to show important features.

Figure 5 is a front view of the holder which is used to hold the stick tray in the machine.

Figure 6 is a bottom view of Figure 5.

Figure 2:
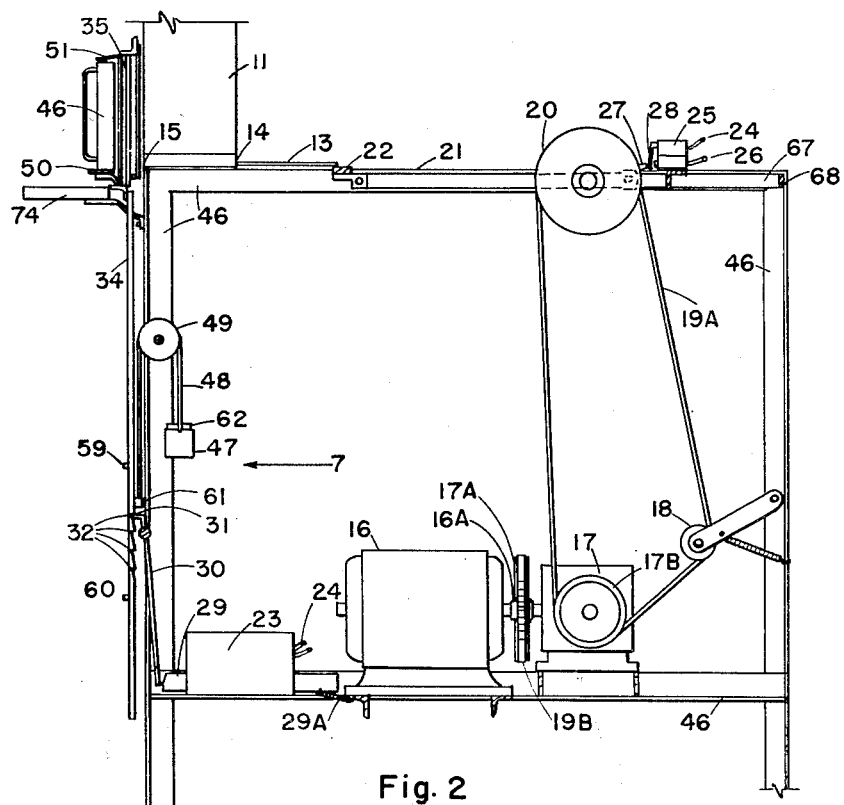
Figure 2 is a side view of the machine showing more particularly the arrangement of the parts.

Figure 7 is a view of part of the inside of the front end as taken in the direction of arrow 7 in Figure 2.

Figure 1:
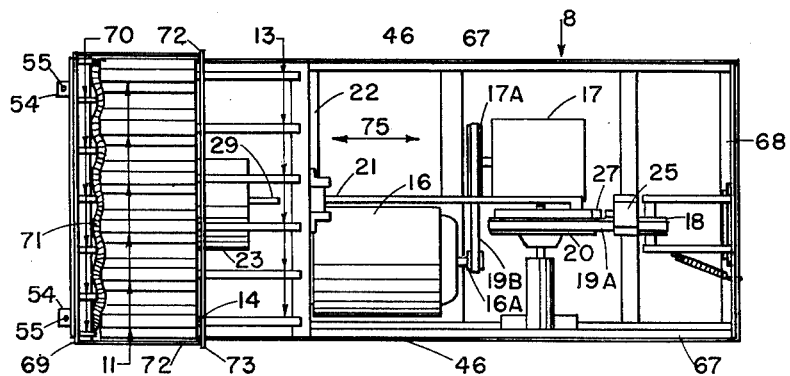
Figure 1 is a plan view of the machine showing more particularly the slide mechanism which pushes the sticks from within the hoppers.

Figure 8 is a view of the drive pulley and switch arrangement taken in the direction of arrow 8 in Figure 1.

Figure 9 is a fragmentary end view of one of the stick hoppers.

Referring more particularly to the drawings:

Stick trays are provided with holes therein which accept four horizontal rows of six sticks each, or four horizontal rows of 12 sticks each. Six hoppers 11 are attached to the top of the frame 46 (Figure 4) and may be any desired height. On the machine just completed, the hoppers run upward through the second floor where they may be easily filled. Shown in Fig. 9, space 12 is left at the very bottom which allows entrance of the pusher bars 13 on the side indicated by the numeral 14 (Figs. 1 and 4), and the exit of the pushed stick 37 from the other side indicated by the numeral 15.

A motor 16, provided with pulley 16A, a gear reduction box 17, provided with pulleys 17A and 17B, pulley belt 19A together with pulley belt 19B provide motive power for the drive pulley 20 which is attached to an arm 21 running parallel to the longitudinal axis of the machine. An arm 22, placed perpendicular to arm 21, carries the six pusher bars 13 thereon, being attached by welding of similar means.

As seen more particularly in Figures 1, 2 and 8, the drive pulley 20 serves the function also of activating the solenoid 23 which is connected by wires 24 to the switch 25, power being allowed to reach the switch 25 by means of wires 26. A cam 27 attached to the pulley 20 touches the spring contact point 28 as the pulley 20 revolves. This pushes the contact point 28 against the switch 25 and allows current to flow to the solenoid 23 causing it to have a magnetizing attraction for the slide trip bar 29 causing it to be centered longitudinally within the solenoid 23. The centering of the trip bar 29 causes it to push against the lever 30 allowing end 31 of the lever 30 to be released from one of the four grooves 32. In Fig. 7 is shown the spring 33 which keeps the lever 30 extended yet allows the slide trip bar 29 to operate it. After the cam 27 passes the switch 25 the current stops flowing to the solenoid 23 and the slide bar 29 is pulled back to its former position by the spring 29A, seen in Figures 2 and 4.

A vetrical slide bar 34, in which the grooves 32 are placed, is connected at its top to a spring guide rack 35 provided with four sets of horizontal springs 36 through which the sticks 37 are pushed and held. To create the proper tension on the sticks 37 as they are pushed between the horizontal springs 36, springs 38 are used to tie each set of springs 36 together and to vertical bars 39 which are attached at the top to an angle iron 40 and at the bottom to an angle iron 41. A guide frame 42 is placed on the side of the spring guide rack 35 which is nearest the hoppers 11. This guide frame 42 serves a twofold purpose, it protects the guide rack 35, and it assists in holding the sticks 37 in proper position.

An angled rod 43 (Fig. 4) having a clasp 44 at its lower end holds the guide rack 35 in a down position against a catch bar 45, until a stick tray 46 (Fig. 2) is placed against the guide rack 35. The purpose of this is to prevent a weight 47, attached to the slide bar 34 through the use of a wire 48 working on a pulley 49, from pulling the guide rack 35 upward where the machine would start working even though a stick tray was not in the machine.

It should be understood that one set of six sticks 37 are pushed from the hoppers at one time. This necessitates the vertical movement of the guide rack 35.

The stick tray 46 is placed against the guide rack 35 where it releases the clasp 44 from the catch bar 45 through the application of pressure against the rod 43. The stick tray 46 is held against the guide rack 35 by the holder 50, seen more particularly in Figures 5 and 6 and in section in Figure 2, and a spring bar 51. The holder 50 is not permanently attached to the guide rack 35, but is removably attached through the application of dowels 52 and 53 (Fig. 6) attached to the bottom of the holder 50, which are placed within holes 54 of the brackets 55 attached to the guide rack 35. The purpose of the two sets of dowels will be explained as we proceed.

As soon as the stick tray 46 is placed against the guide rack 35, the guide rack is pulled upward in the direction indicated by the arrow 56 (Fig. 3) where sticks 37 are immediately pushed into the guide rack 35 and stick tray 46. Automatic stopping and starting of the operation is accomplished by a switch 57 (Fig. 3) placed on the frame 46A, said switch having a switch lever 58. On the vertical slide bar 34 two dowels 59 and 60 are placed at a distance apart to allow them to trip the switch lever 58. When the guide rack 35 is pulled to its highest position the dowel 60 turns the switch 57 on, and when the guide rack 35 is at its lowest position the dowel 59 turns the switch 57 off. Thus it may be seen that the machine is automatically turned on or off.

As soon as the sticks 37 are pushed into the guide rack 35 and stick tray 46 at the bottom, the solenoid 23, activated by the cam 27 and the switch 25, causes the slide bar 24 to trip the lever 30. The weight of the guide rack 35 and the stick tray are heavier than the weight 47 and thus start to descend. This is stopped at the second level, at the next groove 32, as the slide bar 34 moves downward, by the end 31 of the lever 30. This process is repeated two more times until the top row of 6 sticks have been placed within the stick tray 46, at which time the solenoid action again trips the lever 30 and the stop 61 on the slide bar 34 rests against the end 31 of the lever 30. The dowel then touches the switch lever 58 turning off the machine. For the filling of the stick tray 46 having only 24 sticks the following operation is all that the operator must do: Place the stick tray 46 against the guide rack 35, pull the guide rack 35 upward to its highest position, wait until it is full then remove the stick tray. It is not even necessary to remove the stick tray immediately since the machine is turned off and will remain off until the guide rack 35 is again pulled to its highest position.

For the 48 stick tray the same operation is carried through two times without the removal of the tray after the first operation. Actually two changes must be made to change the machine from the filling of the 24 stick tray to the filling of the 48 stick tray. The holder 50 must be adjusted to allow the dowels 53 to be placed within the holes 54 (dowels 52 are used for the 24 stick tray) and a weight 62 must be added to the weight 47 to compensate for the additional weight.

After the 48 stick tray has been filled with four rows of six sticks each, the guide rack 35 must be pushed to the right in the direction indicated by arrow 63 in Figure 3, then lifted to allow four more rows of six sticks each to be placed in the stick tray. In Figures 3 and 7 it may be seen that the vertical slide bar 34 is movably attached to horizontal slide bars 64 and 65 which allow a horizontal adjustment indicated by the arrows 66 in Figure 3.

Since timing is important in this machine, it should be understood that all parts are so constructed and arranged that each action of the individual parts fall in proper sequence to the action of the other parts.

To allow perfect alignment for the pusher bars 13, two longitudinal bars 67 (Fig. 1), having a connecting bar 68, are attached at the ends of the arm 22. These move backward and forward in the direction indicated by the arrow 75 in unison with the arm 22 and the pusher bars 13.

The frame 46 is made of angle and bar iron welded together. In Fig. 3 the horizontal and vertical bars 46A, 46B, 46C, and 46D are welded or otherwise attached to the horizontal slide bars 64 and 65. Since the pulley 49 is attached to the bar 46B it also moves horizontally keeping it in line with the slide bar 34.

A frame encloses the six hoppers 11, being formed of angle iron 69 having ribs 70 which push against a spring 71 used to cushion the hoppers 11. Since the hoppers 11 are constructed of sheet metal or the like, they may be bent inward by undue pressure which would cause the sticks 37 to jam within the hoppers 11. By using the spring 71 the desired pressure is applied at all times to hold hoppers 11 at the desired position, yet not enough to injure them. Attached at each end of the angle 69 are rods 72 which are connected by rod 63.

A tray 74, shown in Figure 2, is attached to the frame 46 to provide working space when needed.

While I have shown herein the best form of the invention known to me at the present time, I desire it to be understood that I reserve the right to make alterations and changes insofar as said alterations and changes are covered by the following claims.

What I claim is:

1. A machine to dispense sticks horizontally into a stick tray, comprising a metal frame, a plurality of vertical hoppers to hold the sticks positioned on one end of the top of the frame, a plurality of horizontal pusher bars provided with motive means for entering one side of the said hoppers, a vertical bar attached to horizontal bars, said horizontal bars movable in a horizontal manner and attached to said frame, said vertical bar having a rack attached at its top end, said rack provided with means to receive and hold said sticks, and means provided on the rack to receive and hold a stick tray, a plurality of grooves placed on the vertical bar, a trip lever positioned to encounter said grooves, means provided to release said trip lever at intervals, a switch for turning the machine on and off located on the frame near the vertical bar, and means provided on the vertical bar to turn the switch on and off automatically.

2. A machine to dispense sticks horizontally into a stick tray, said machine composed of a frame, hoppers attached to said frame, a drive pulley connected to a motor and gear reduction box, said drive pulley connected to and operating pusher bars which push sticks horizontally from the hoppers, said drive pulley also provided with a cam which operates a switch, said switch connected to and operating a solenoid, said solenoid controlling the vertical movement of a bar attached at its top to a rack, said rack provided with means for receiving and holding a stick tray, means also provided on said rack to receive and hold the sticks, means provided on the said bar attached to the said rack to control the starting and stopping of the machine.

3. A stick dispensing machine, composed of a metal frame, a motor and gear reduction box attached to said frame, pulleys attached to said motor and gear reduction box, a drive pulley attached to the top of the frame, pulley belts connecting said motor, said gear reduction box, and said drive pulley; pusher bars attached to a horizontal bar, said horizontal bar connected eccentrically to said drive pulley by a longitudinal bar, said pusher bars positioned to allow entrance into hoppers holding the sticks, said sticks pushed from said hoppers by the push bars, a switch attached to the frame on a level with the horizontal axis of the drive pulley, a cam attached to the perimeter of the drive pulley, said switch connected to wires through which electric current is received, said switch provided with a spring contact lever which is compressed to complete the circuit upon contact with the said cam, a solenoid connected to said switch, a slide bar positioned within the said solenoid, two horizontal bars movably attached to the end of the frame, vertical and horizontal brace bars attached to and connecting said horizontal movable bars, said vertically movable guide bar having four grooves, a trip bar attached to one horizontally movable bar, said trip bar positioned to fit into the grooves one at the time, said trip bar released from said groove by the said slide bar through action of said solenoid, a guide rack positioned at the top end of the vertically movable bar, said guide rack positioned at a height to allow entrance of the pushed sticks into the guide rack, a plurality of horizontal springs attached to said guide rack to hold said sticks, and a switch attached to one horizontal bar in a position to allow the vertically movable bar to turn the machine on at its highest position and off at its lowest position.

RALPH H. BLOXHAM.

References Cited in the file of this patent

UNITED STATES PATENTS

| Number | Name | Date |
|---|---|---|
| 1,534,338 | Weihmann | Apr. 21, 1925 |
| 2,251,333 | Griffin et al. | Aug. 5, 1941 |
| 2,570,891 | Weaver et al. | Oct. 9, 1951 |